A. SWITZER.
GRADE INDICATOR.
APPLICATION FILED FEB. 8, 1915.
1,170,466.
Patented Feb. 1, 1916.
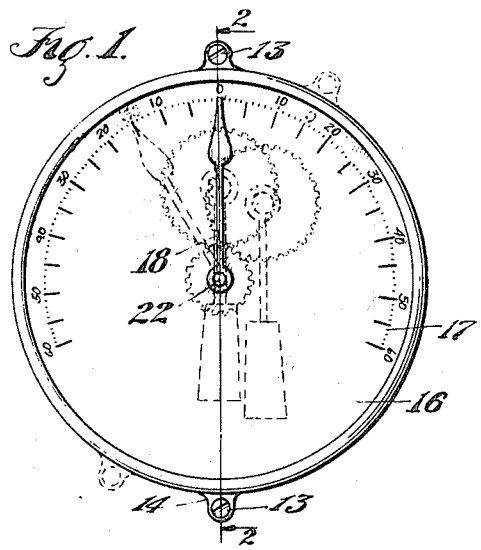
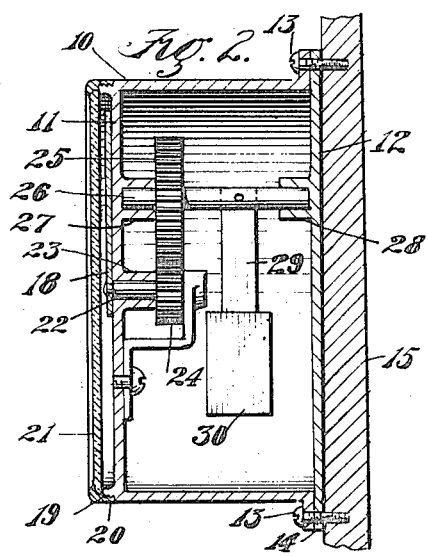
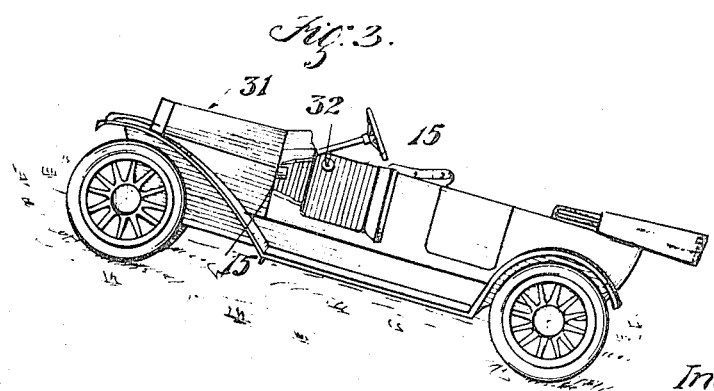
Witnesses:
James M. Abbott
Marguerite Bates
Inventor:
Andrew Switzer
By
Attys.

UNITED STATES PATENT OFFICE.

ANDREW SWITZER, OF LOS ANGELES, CALIFORNIA.

GRADE-INDICATOR.

1,170,466.  Specification of Letters Patent.  Patented Feb. 1, 1916.

Application filed February 8, 1915. Serial No. 6,727.

*To all whom it may concern:*

Be it known that I, ANDREW SWITZER, a citizen of the United States, residing at Los Angeles, in the county of Los Angeles, State of California, have invented new and useful Improvements in Grade-Indicators, of which the following is a specification.

This invention relates to a grade indicator.

It is the object of this invention to provide a device which is especially applicable for use on automobiles and like vehicles for indicating the grade traversed by the vehicle at any time, so as to enable the driver of the vehicle to determine the degree of inclination of the surface over which the vehicle is traveling.

Another object is to provide a device of the above character which is gravity-operated, and so constructed that a longitudinal inclination of the vehicle to which it is attached will effect the movement of an indicating pointer on a dial on an arc of travel in excess of the degree of inclination of the vehicle, so that a slight vertical or inclined movement of the vehicle will effect a plainly visible movement of the indicating pointer.

The invention is illustrated in the accompanying drawings, in which:

Figure 1 is a view of the indicator in front elevation, illustrating the normal position of same in full lines, and showing the manner of indicating an angle of inclination in dotted lines. Fig. 2 is a view in vertical section and elevation, on the line 2—2 of Fig. 1, as seen in the direction indicated by the arrows. Fig. 3 is a view of an automobile with portions broken away, illustrating the application of the invention.

More specifically, 10 indicates a casing which is preferably cylindrical in form and is closed at one end by means of a plate 11, preferably formed integral with the cylindrical casing 10, and is adapted to be closed at its opposite end by means of a demountable plate 12; the plate 12 being secured to the cylinder 10 by means of screws 13, or other suitable fastenings, passing through lugs 14 on the casing 10. The screws 13 may also be employed to secure the casing 10 to a wall or panel 15 on the vehicle to which the device is to be attached. The outer end of the end-plate 11 is formed with a dial 16, having graduations 17 thereon, designating degrees of inclination in relation to the horizontal; the graduations 17 being numbered to read to the right and left of the vertical center of the dial at the top thereof. The graduations 17 are spaced on the arc of a circle and are designated by numbers less than the true degree of the arc on the circle. For illustration: Reading from the center of the dial at its top either to right or left thereof, the graduation indicating 30 degrees is that graduation which is ordinarily designated as the 60-degrees graduation designated on a protractor. The purpose of this arrangement is to enable a correct reading of the degree of longitudinal inclination of the body 15 to which the casing 10 is attached, by means of an indicating pointer 18, mounted in front of the dial 16, and adapted to have a movement in relation to the dial on an arc in excess of the arc of inclination of the body 15, as will be later described.

The end plate 11 is formed with an annular externally threaded flange 19 to receive a ring 20, by means of which the transparent plate 21 is held in place on the flange 19 to form a cover for the dial 16 and the pointer 18. The pointer 18 is rigidly mounted on a shaft 22, extending through and revolubly mounted in a hub 23, formed on the rear face of the plate 11.

In the form of the invention shown in Figs. 1 and 2, the shaft 22 is fitted with a spur pinion 24, which meshes with a spur gear 25, on a shaft 26; the pinion 24 and gear 25 being here shown as proportioned in the ratio of two to one, that is, of such proportion that one rotation of the gear 25 will effect two rotations of the pinion 24, shaft 22 and pointer 18. The shaft 26 is supported at one end in a hub 27, mounted on the inner face of the plate 11, and has its opposite end supported in a hub 28, formed on the inner face of the end plate 12. Depending from the shaft 26 and rigidly secured thereto is a hanger 29, on the lower end of which is affixed a weight 30, which weight is adapted to effect an oscillating movement of the shaft 26 in relation to the casing 18, as the latter is rocked transversely on its longitudinal axis.

In the application and operation of the form of the invention just described, the cylindrical casing 10 is affixed to a longitudinal wall or body 15 on the vehicle 31, as indicated at 32 in Fig. 3. The pendent weight 30 will then be positioned to swing longitudinally of the vehicle 31, and will operate, as the vehicle is inclined to hold the shaft 26 stationary, while the casing 10 turns in relation thereto, though carrying the shaft 26 therewith. For illustration: Assume the vehicle body to be on a level so as to dispose the casing 10 in its normal position, as shown in full lines in Fig. 1, with the pointer 18 extending vertically and indicating the zero graduation 17. A longitudinal inclination of the vehicle 31 will effect a corresponding movement of the casing 10. For instance, assume that the vehicle 31 is inclined on a grade of 30 degrees. The casing 10 being fixedly secured to the automobile body will be rotated through corresponding arc and will turn on an arc of 30 degrees. The weight 30, acting on the shaft 26, will hold the latter against rotation in relation to the weight 30, so that as the casing 10 moves on its axis, carrying the shaft 26 therewith, the gear 25 will operate to rotate the pinion 24 and thereby advance the pointer 18 in a direction opposite the movement of the cylinder 10 on an arc of travel corresponding to the arc of movement of the casing 10 and dial 16, only in the opposite direction. The movement of the dial 16 and the pointer 18 will thus be on an arc twice that of the actual longitudinal inclination of the vehicle 31. However, by reason of the enumeration of the graduations 17, as before described, the pointer 18 will indicate the graduation 30, as shown in dotted lines in Fig. 1, thus denoting that the vehicle 31 is on a 30 degree grade. By this arrangement any longitudinal inclination of the vehicle will cause an increased movement of the pointer 18 in relation to the dial 16, so that the movement of the indicator will be plainly discernible, thus permitting the device to be made small and compact.

While I have shown the pointer as adapted to be moved on an arc of travel in excess of the arm of movement of the vehicle body in the ratio of two to one, it is manifest that this ratio may be varied to any desired degree by changing the proportions of the gears 24 and 25 or 33 and 34 as occasion may require.

What I claim is:

A grade indicator for vehicles, comprising a casing of cylindrical form, a detachable base provided with a boss having an aperture for a shaft, a cover integral with said casing, a boss upon said cover provided with an aperture for a shaft registering with said first mentioned aperture, a rotatable shaft mounted in the apertures of said boss, a pendent weight fixedly secured to said shaft, said cover provided with a second boss having an aperture for a shaft, a bracket provided with a bearing for a shaft mounted on said cover, a shaft mounted in the aperture of said last mentioned boss and said bracket bearing, a pinion on said last mentioned shaft meshing with said first mentioned pinion, a pointer on said last mentioned shaft disposed exterior of the cover for indicating grade.

In witness that I claim the foregoing I have hereunto subscribed my name this 29th day of December, 1914.

ANDREW SWITZER.

Witnesses:
MILDRED BATES,
MARGUERITE BATES.